Patented Dec. 18, 1923.

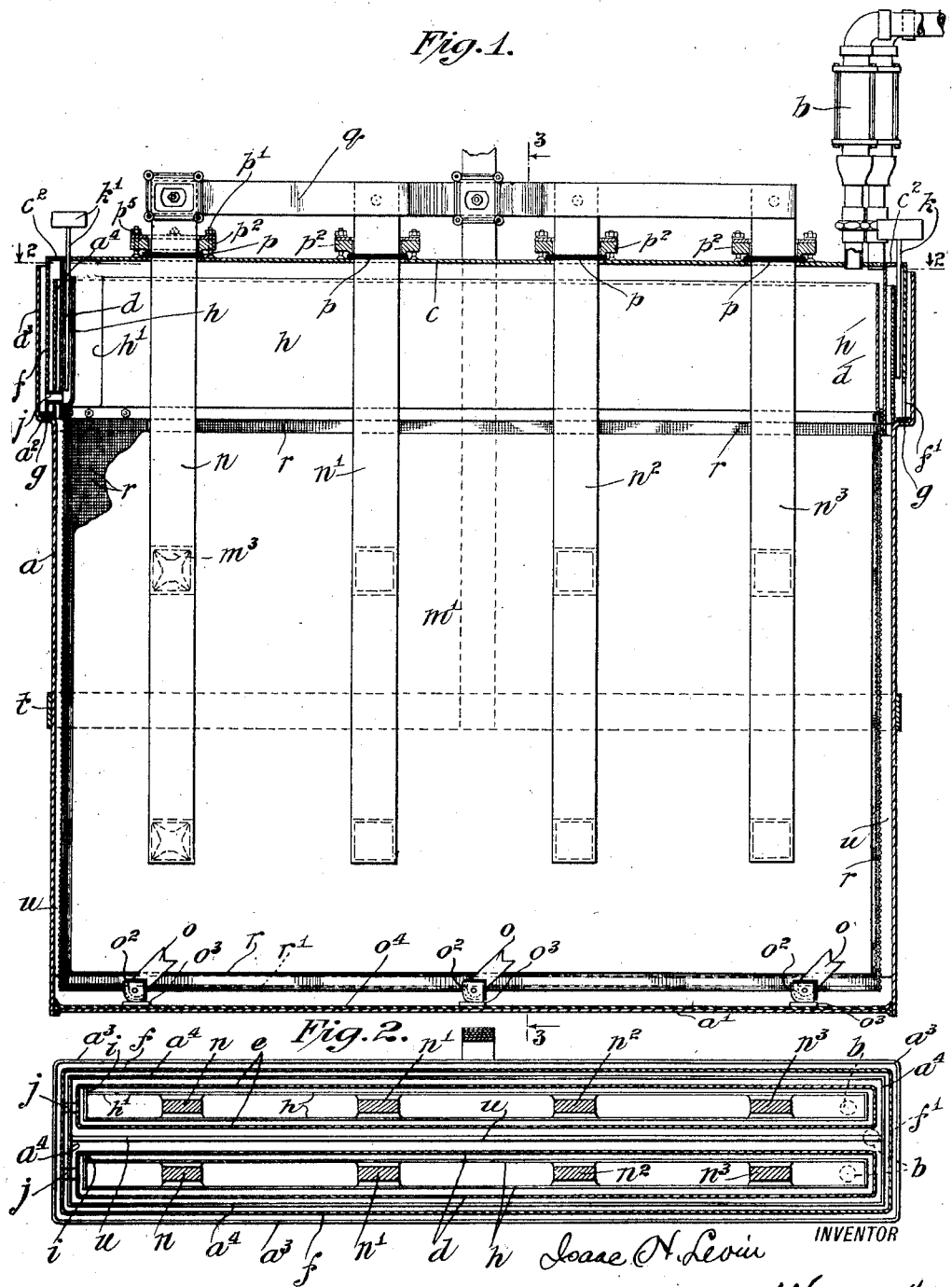

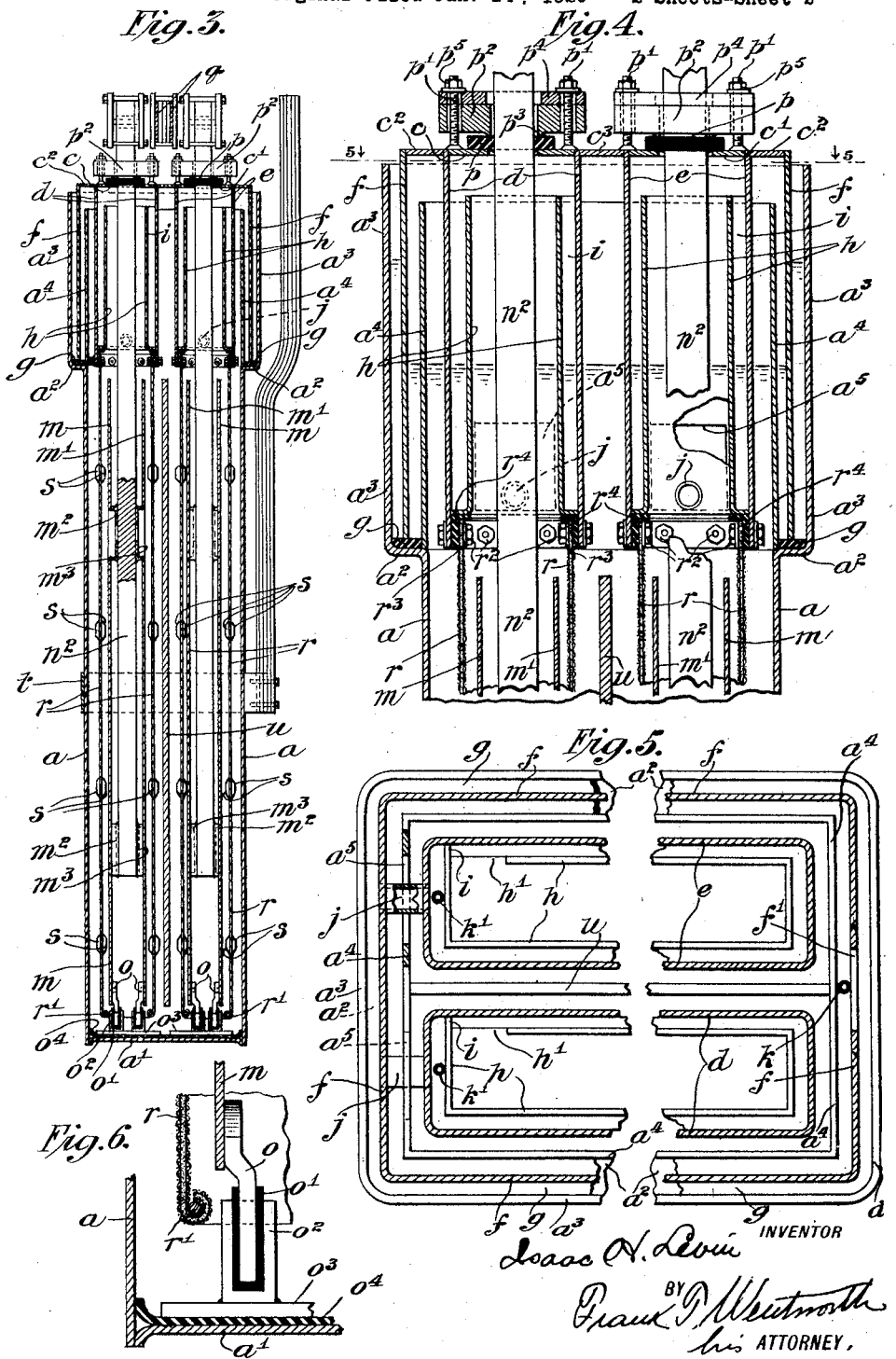

1,478,340

UNITED STATES PATENT OFFICE.

ISAAC H. LEVIN, OF NEW YORK, N. Y.

ELECTROLYTIC CELL FOR GENERATING OXYGEN AND HYDROGEN.

Application filed January 14, 1920, Serial No. 351,363. Renewed April 24, 1923.

*To all whom it may concern:*

Be it known that I, ISAAC H. LEVIN, a citizen of the United States, residing at the borough of Manhattan, city, county, and State of New York, have invented certain new and useful Improvements in Electrolytic Cells for Generating Oxygen and Hydrogen, of which the following is a specification, reference being had therein to the accompanying drawings, which form a part thereof.

My invention relates to electrolytic cells for generating oxygen and hydrogen, and more particularly to a cell of the unipolar type wherein the tank for the electrolyte forms one of the electrodes.

In the present application it is not my intention to claim the electrolyte circulating system adjacent the top of the cell, such being made the subject matter of my co-pending application Serial No. 351,364.

To secure the desired output capacity in a plant composed of cells of the character to which my invention relates, a considerable number of cells are coupled in electrical series, forming large batteries, the number of cells in each battery varying according to the desired output capacity of the E. M. F. used.

Heretofore, owing to the difficulties of producing individual cells of a weight which will permit their being readily handled, of securing an effective distribution of the electric current, of maintaining a fixed relation of parts, and of guarding against leakage of gas from one gas chamber to another and an effective circulation of the electrolyte, it has been necessary to limit the dimensions and the resultant capacity output of each cell, with a certain loss of efficiency in the cell due to a necessary limitation of the amperage of each cell, and a slight increase of the actual voltage required.

With these conditions in mind, I have produced a cell having high output capacity because of those structural characteristics which will permit a material increase in the effective surface areas of the electrodes without such an increase of weight as will interfere with the convenient handling of the cell either during construction or installation. Owing to such increase in surface area, high amperage may be used in the operation of the cell, with a material drop of the potential of the current required as compared with the output capacity of the plant.

In the construction of a cell made in accordance with my invention, I employ sheet metal throughout, except in the terminals and various minor fittings, and while this metal must of necessity be of a thicker gauge than that required in smaller cells, in order to secure the desired rigidity in the cell structure, I so construct and associate the various parts, that the inner electrode structure, terminal bars, and other appurtenances, will be supported from the bottom of the tank, thus securing the twofold advantage that since the inner electrode structure is not suspended from the cover, fairly light stock may be used in the cover, and permanency in the position of the inner electrode with relation to the wall of the tank may be thus secured.

The cover, therefore, merely serves to seal the top of the tank, and form therewith separate non-communicating gas chambers adjacent the top thereof; to co-operate with the upper tank structure in ensuring such a circulation of the electrolyte as will assist in effectively equalizing the pressures upon opposite sides of the diaphragm, without likelihood of gas bubbles being carried in suspension in the electrolyte flowing from adjacent one electrode to adjacent an electrode of opposite polarity; to support the gas off-take, or indicator mechanisms, and to support the insulating means for the terminal bars in a manner to hold the upper part of the inner electrodes against possible displacement.

With a high capacity cell, I have found it essential to conduct the electric current to the body of the inner electrodes in order to ensure an effective distribution thereof throughout the plate or plates forming each of said electrodes, and to connect the electrical terminal of opposite polarity with a terminal band inclosing the tank or outer electrode at a point intermediate the top and bottom thereof, and of the inner electrode.

Furthermore, I have found that in a high capacity cell, it is essential to use a diaphragm so reinforced or stiffened as to prevent its deformation from pressures resulting from the movement of the electrolyte therethrough from adjacent the anode to adjacent the cathode, it being desirable under some conditions to provide buffers of non-conductive material to prevent contact of the reinforcing or stiffening material with the electrodes and a resultant short circuiting of the cell through the cover.

As stated above, the diaphragm is supported from the cover, which latter is insulated from the tank, so that in connecting the diaphragm with the cover, it is essential to inclose the edge of the diaphragm in a strip of insulating material to prevent such contact of electro-conductive reinforcing or stiffening material embodied in the diaphragm structure with the metal of the cover, as would form a path for the electric current to the cover.

The reinforcement of the diaphragm is made necessary in part because of the large area thereof, and in part because with an electrode supported from the bottom of the tank, the diaphragm must hang freely from the cover and have an open bottom, although it completely incloses the inner electrode at the sides and ends.

The structural characteristics of the various elements of the cell lend themselves readily to a multiple unit type of cell employing a single tank divided by a vertical partition in electrical connection therewith, and electrodes of similar polarity, but of opposite polarity as to the tank and the partition upon opposite sides of said partition.

While the construction employed to permit a free circulation of the electrolyte towards the upper part of the cell without likelihood of gas bubbles being carried from adjacent an electrode of one polarity to adjacent an electrode of the opposite polarity, contributes toward the purity of the gases produced and serves as a great factor of safety in the operation of the cell, I supplement this feature by providing means whereby in the event of the development of excessive pressure upon opposite sides of a diaphragm, or the lowering of the level of the electrolyte in the cell from an improper feed of distilled water to the cell, or neglect to renew the supply of such water for feed purposes, each gas will be discharged or vented to atmosphere directly from its own chamber. Furthermore the cover structure is such that while the various parts are welded together, the various welded joints are so located that any gas leakage resulting from imperfections in the joint will either be into the chamber containing the same gas, or to atmosphere.

The invention consists in the several novel features of construction and combination of parts hereinafter set forth and described, and more particularly pointed out in the claims hereto appended.

Referring to the drawings,

Fig. 1 is a vertical section through a cell embodying my invention;

Fig. 2 is a horizontal section on the line 2—2 of Fig. 1;

Fig. 3 is a transverse section upon the line 3—3 of Fig. 1;

Fig. 4 is an enlarged detail view of the upper part of the cell on the section shown in Fig. 3;

Fig. 5 is an enlarged detail view of the circulating trough structure upon the section shown in Fig. 2, with intermediate portions of the cell structure broken away; and Fig. 6 is an enlarged detail view of the lower part of the cell upon the section shown in Fig. 3.

Like letters refer to like parts throughout the several views.

In the embodiment of the invention shown in the drawings, the cathode of the cell is formed of a sheet metal tank structure $a$, the bottom $a'$ of which is formed of a flanged plate secured to the side wall of the tank by means of a welded joint. In addition to forming one of the electrodes of the cell, said tank serves as a container for the electrolyte and in co-operation with a cover therefor which will be described in detail hereinafter, forms non-communicating gas chambers adjacent the top thereof in which the oxygen and hydrogen generated, are respectively accumulated and from which they are withdrawn by means of the gas off-take system indicated at $b$.

The upper edge of the tank $a$ is formed with an offset portion as shown at $a^2$ and a vertically extending top wall $a^3$ which extends completely about the cell and forms the outside wall of the outer trough of the electrolyte circulation system adjacent the top of the cell. Secured to the inner edge of the offset portion $a^2$ is a sheet metal plate $a^4$ arranged parallel with the wall $a^3$ and forming the inner wall of the outer trough above referred to. The wall $a^4$ is secured in position by means of a welded joint, the construction thus being such that in the event of any imperfection in the joint, any leakage of gas will not be to atmosphere but to within the said trough, where it will ultimately be discharged into the gas chamber for that particular gas, which in the instance shown will be hydrogen. Furthermore, any electrolyte escaping through a channel due to imperfections in this joint, will either be from the trough to the interior of the tank, or vice versa, thus preventing the escape of the electrolyte to the outside of the cell.

The wall $a^4$ is lower than the outer wall $a^3$ for the purposes of avoiding contact of this wall with the cover, which is out of the path of the current, being thoroughly insulated from said tank, and having the top of the inner channel of the trough open into the gas chamber within the tank.

The cover of the tank comprises a plurality of separate plates, some of which close the chamber or chambers for oxygen, and others of which close the chamber or chambers for hydrogen, these plates and vertically extending baffles being so welded together as to form one integral cover structure, the various welded joints of which will be so located that leakage due to any possible imperfections in the joint will be to atmosphere instead of from one gas chamber to the adjacent chamber. The top of said cover is formed of plates $c$ and $c'$, the edges of which abut against the inner wall of pendant baffles $d$ and $e$, which baffles conform to the contour of the tank $a$, thus forming a continuous barrier dividing the upper part of the tank into the two separate gas chambers heretofore referred to, and plates $c^2$ and $c^3$, the inner edges of which abut against, and are welded to, the outer face of said baffles $d$ and $e$. Secured to the outer edge of the plate $c^2$ is a pendant baffle $f$ which extends between the walls $a^3$ and $a^4$ into engagement with an insulating pad $g$ in the bottom of the outer trough, which forms a liquid and gas-tight joint about the edge of said baffle in addition to supporting the cover without permitting it to come into electrical contact with the tank $a$. Said baffle $f$ also divides the outer trough into two separate channels connected at one point only in a manner to be described.

The baffle $f$ in co-operation with other parts of the cover forms a gas-tight chamber about the chambers formed by the baffles $d$ and $e$ respectively.

Secured to the inner face of each baffle $d$ and $e$ is a continuous angular plate $h$, forming with said baffle, a trough within the gas chamber formed thereby, which, for purposes of convenience I will designate the inner trough, and which, with the outer trough heretofore referred to, constitutes a part of the electrolyte circulation system toward the top of the cell, by means of which the electrolyte may surge from adjacent one electrode to adjacent the other toward the top of the body of electrolyte, without likelihood of conveying bubbles containing hydrogen to the oxygen gas chamber, and bubbles containing oxygen to the hydrogen gas chamber.

The baffle $f$ has an opening $f'$ adjacent the bottom thereof at one end of the cell, to permit electrolyte to flow from the channel on one side of said baffle to the channel on the other side thereof, while the plate $h$ has a similar opening $h'$ through which electrolyte may flow between the interior of the tank and the trough formed between said plate and the baffle $d$ or $e$. Upon one side of the opening $h'$ is a barrier $i$ extending completely across the inner trough, so as to permit the electrolyte to flow to or from said opening $h'$ in one direction only. Communicating with said trough adjacent said barrier $i$ is a horizontally extending tube $j$ communicating with said trough adjacent the bottom thereof, and with the outer channel of the outer trough adjacent the wall $a^3$. This tube is supported by the baffle $f$ and the plate $h$ passing through an opening $a^5$ in the wall $a^4$ so as to have no electrical contact with said wall. This tube $j$ in addition to placing the two troughs in communication with each other, will serve to accumulate gas bubbles contained in the electrolyte flowing therethrough, upon the upper wall thereof, so that these bubbles will gradually merge into larger bubbles and thus be discharged into atmosphere in the form of gas when the flow of electrolyte is from the tank. The baffle $f$ divides the outer trough in such a manner as to form two long, connected channels opening at the top within the gas chamber, so that in the event of a flow of the electrolyte through the outer trough from the tank towards said tube, such bubbles will merge with each other while flowing through this long tortuous channel and thus either be discharged within the gas chamber for said gas, or into atmosphere before reaching said tube.

The opening $a^5$ in the wall $a^4$ through which the tube $j$ passes is of relatively greater dimensions than said tube, so that the cover will not be placed in electrical connection with the tank through contact of said tube with said wall. This opening also serves as a source of communication between the inner channel of the outer trough and the tank proper.

Under normal working conditions the level of the electrolyte in the tank will be above the openings $f'$ and $a^5$, the bottom of the inner and the outer troughs being both normally below the level of the electrolyte in the tank. In the event of the lowering of the level of the electrolyte materially below normal, as a result of the development of excessive pressures within the cell or a failure to provide for an adequate renewal of the supply of said electrolyte by feeding distilled water thereinto, it is essential to provide means whereby gases under such conditions will be vented directly to atmosphere instead of accumulating within the cell and forming a potential source of accident. This condition may also arise in the event of stoppage of the offtake system.

In the form of the invention shown, in the event of the lowering of the level of the electrolyte to a point below the opening $f'$ and the tube $j$, oxygen will escape freely through said tube $j$ to the outer channel of the outer trough at one end of the cell, while hydrogen will escape freely through the opening $f'$ to said outer channel at the other end of the trough, thus permitting the escape of both gases to atmosphere at widely divergent points so as to minimize likelihood of accident.

If desired, in addition to a possible venting of the cell in the manner above described, I may also use vent pipes $k$ and $k'$, one of which opens into the inner channel of the outer trough adjacent the opening $f'$, while the other opens into the inner trough adjacent the tube $j$, the bottom of said vent pipes terminating respectively above said opening and said pipe so that the gas will be vented before the electrolyte level reaches the point where said opening and said pipe will be exposed above the electrolyte. Such vent pipes have the advantage that in the event of a blow-out no substantial volume of electrolyte will be carried to the outside of the cell, while if the tube $j$ and opening $f'$ are relied upon for such venting, the increase of pressure will raise the level of the electrolyte in the outer channel of the outer trough to a point where this trough will overflow and the electrolyte may splash about the outside of the cell and be condensed upon the heated wall of the tank and form an unsightly deposit thereon. Furthermore, if desired said vent pipes may be connected with fill cups, so as to constantly furnish distilled water to the respective troughs.

In a high capacity cell, the mounting of the inner electrode (usually the anode) presents two problems because of the large dimensions of the electrode and resultant weight, and the difficulty of securing an effective distribution of the current throughout the entire surface of the electrode. In all types of unipolar cells heretofore constructed, it has been the practice to suspend the electrodes from the cover by means of a terminal bar. In the cell shown in the accompanying drawings, the electrode instead of being supported from the cover, is supported from the bottom of the tank, and the cover is used merely to hold the electrode against displacement through the medium of the terminal bars. This construction permits the use of a light cover without likelihood of distortion as a result of the load of the inner electrode, but necessitates the thorough insulation of this electrode from the tank at the various points of support.

In an electrolytic cell, it has been the universal practice to connect the terminal bar with the electrode plate at the upper edge thereof, which construction has been found inadequate in high capacity cells, to secure a proper and effective distribution of the current, and an economical and effective operation of the cell.

As shown in the accompanying drawings, the inner electrode is composed of two plates $m$ and $m'$ which are preferably of thin sheet metal, such as steel, disposed upon opposite sides of a plurality of flat metal terminal bars $n$, $n'$, $n^2$ and $n^3$, extending between said plates to a point adjacent the bottom thereof, and each connected thereto at a plurality of different points, so as to secure widely divergent points of electrical contact between each of said bars and each of said plates. The plates $m$ and $m'$ may be imperforate or perforate, as desired, and the outer faces thereof may be of steel, or may be formed of an electro-deposit of nickel, cobalt or any other desired material for reducing surface tension at the plates and securing a more economical operation of the cell through a reduction of the voltage required.

To secure the desired area of contact between the terminal bars and said plates, and to properly space the plates with relation to each other and to the adjacent electrode of opposite polarity, and also to provide contact surfaces at widely divergent points, I form depressions $m^2$ and $m^3$ in the plates $m$ and $m'$ extending toward the respective terminals, the edges of which depressions are welded to said terminals with the twofold effect of the formation of a permanent joint between the plates and the bars, and the exclusion of electrolyte from the space between the depressed portions and the bars, to prevent possible resistance at this point resulting from the presence of such electrolyte.

The upper ends of the terminal bars $n$—$n^3$ project through openings in the plates $c$ or $c'$, the dimensions of which are such as to preclude electrical contact of said bars and the metal of the cover. The lower edge of each of the plates is provided with a plurality of legs $o$ welded thereto and extending below the lower edge thereof. Each of these legs has its lower end inclosed in insulating material $o'$ such as asbestos cloth, and is held in place by means of a metallic cap $o^2$ secured to said asbestos sheet and to said legs by means of suitably insulated rivets. These caps are permanently secured to a heavy metal base $o^3$ preferably by being welded thereto, which base rests upon a sheet $o^4$ of insulating material covering the bottom of the tank $a$ and turned up at the edges so as to minimize any tendency of contact between the supports for the electrode and the tank, and to prevent the flow of the current from the tank toward the base $o^3$ in the event of the failure of the insulation of the legs.

Surrounding the projecting end of the respective terminal bars for each inner electrode is a gasket $p$ of soft vulcanized rubber, or other insulating material, adapted to seat upon the cover and close the opening through which said terminal bar passes, and pack both said opening and the sides of the terminal bar adjacent thereto. Secured to the cover about the opening for each terminal bar, are a plurality of screw studs $p'$, the heads of which are welded or otherwise secured to said cover, so as to have these studs occupy a fixed position with relation to said opening without the necessity for insulating or packing same to prevent leakage of gases thereabout. Slidably mounted upon said studs is a block of wood or other insulating material $p^2$ having on the lower face thereof adjacent the terminal bar, a pendant wedge-like member $p^3$ adapted to localize the pressure upon the gasket $p$ in a manner to distort it in a manner to force it into intimate engagement with the edge of said opening and the face of the terminal bar. The block $p^2$ which may be of wood, hard vulcanized rubber or other electro-non-conductive material, is provided with a wear face of metal $p^4$ against which the nuts $p^5$ carried by the several studs $p'$ bear in forcing said blocks toward the cover for the purpose of forming the joint.

The various terminal bars of each electrode are coupled in multiple with the source of current supply as by means of properly formed bars $q$.

Surrounding each of the inner electrodes $m$ and $m'$ is a porous, gas impervious diaphragm having the usual function of dividing the lower part of the tank into electrolyte chambers, and preventing gas bubbles flowing from adjacent one electrode to adjacent the other. The structure of the diaphragm shown, however, differs from that heretofore used, because of the difficulties present in a high capacity output cell due to the increased area of the diaphragm employed, and its increased weight, which have a tendency, particularly when using a woven fabric asbestos diaphragm, to stretch the diaphragm in a manner to cause its rapid deterioration and the formation of openings therethrough through which gas may possibly pass from one side thereof to the other. To obviate this condition, I provide the diaphragm $r$ with a suitable reinforcement such as a large mesh, woven wire upon the opposite faces thereof, which wires are so embedded in the material of the diaphragm as to impart the desired rigidity thereto, to prevent distortion of the diaphragm either as a result of the weight inherent thereto or as a result of the flow of the electrolyte therethrough from adjacent the cathode to adjacent the anode. The diaphragm instead of being closed at the bottom, or cup-shaped, as is the usual practice, is left open and the opposite sides thereof are weighted by means of bars $r'$ of glass or other suitable insulating material about which the lower edge of the diaphragm is wrapped, so as to hold the diaphragm substantially taut.

The upper edge of the diaphragm is secured to the lower edge of the baffle $d$ by means of insulated bolts $r^2$ and a clamp bar $r^3$, it being essential, however, to provide a strip $r^4$ of insulating material such as asbestos cloth between said diaphragm and said baffle to minimize any tendency of the current following the reinforcing metallic mesh upon the face of said diaphragm, to the cover. The dimensions of said diaphragm are such as to project slightly above and below all the exposed metallic portions of the plates $m$ and $m'$ and their supporting legs $o$ and across both ends of the space adjacent said inner electrode, the diaphragm presenting a continuous barrier about the inner electrode.

Notwithstanding the reinforcement of the diaphragm in the manner described, its large area results in a tendency of the diaphragm to buckle slightly, so that there is always likelihood of its engaging the face of one electrode or the other (usually the outer electrode, since the flow of the electrolyte through said diaphragm is toward said electrode). To minimize this condition, I provide at various points of the surface of the diaphragm, buffers $s$ formed of looped insulating material such as asbestos cloth, which in the event of distortion of the diaphragm will, by engagement with the electrode, tend to check such distortion before the efficiency of the cell has been materially effected.

While with the construction of inner electrode described, the current is delivered to each plate at different points of the body thereof, so that the normal tendency of the current to spread throughout the plate will cause an effective distribution of the current, it is also desirable to secure a somewhat similar distribution of the current throughout the tank or outer electrode. With this end in view, I provide a metallic band $t$ of metal having high conductivity such as copper, completely encircling said tank at a point substantially centrally of the inner electrode, which band is in electrical contact with said tank $a$ at all points. This band is connected with the negative terminal at one point thereof, but its central location on the tank surface effects a substantially uniform effectiveness of that entire surface of said tank, opposed to said inner electrode.

In use the entire cell structure is insulated from ground.

Extending across the tank $a$ and electrically connected with opposite ends thereof, is a partition $u$, an inner electrode and diaphragm structure being arranged upon each side of this partition, thus forming a multiple couple cell with a corresponding increase in the capacity of the unit. The partition u is held in position by being welded or otherwise permanently secured to the end walls of the tank a, the bottom of said partition being positioned above the bottom of said tank and the top thereof below the cover. This partition extends above, below and beyond both sides of the inner electrode plates, the space below the partition causing the level of the electrolyte upon opposite sides thereof to be always equal.

The structure of cover described is adapted for a two couple cell, it being understood, however, that if desired the number of partitions and inner electrodes and diaphragm structures used may be increased by increasing the size of the tank a and using additional baffles d or e upon the cover for said tank.

The gas offtake system b consists of suitably insulated offtake pipes connected respectively to the gas chamber formed between the baffles d and f, and e and f, and to the chamber within said baffles d and e respectively.

The operation of the herein described cell is substantially as follows:—

A cell as heretofore described is particularly adapted to meet the conditions present in a high amperage cell having correspondingly large capacity output. With such a cell the weight of each unit and of the volume of electrolyte in the cell, the higher gas pressures, and the more rapid circulation of the electrolyte are all factors to be contended with. Hence while the construction shown and described is such as will reduce the weight of the cell itself, confine the gases generated in a manner to minimize possibility of leakage, and if leakage should occur, prevent the admixture of gases within the cell with resultant impurities in each gas produced, and permit an increase in the circulation without resultant deformation of the diaphragm or conveying of gas bubbles from one gas chamber to adjacent other gas chambers through the diaphragm or the circulation trough, it is apparent that the use of the characteristics in lower capacity cells is possible even though the desired high output capacity is not secured by such use.

By using a large area inner electrode and a tank of correspondingly large dimensions, I am not only enabled to secure an increase in capacity output due to the increase in the amperage of the cell, proportionate to the increase of the area of the electrodes, or an increase in the volume of electrolyte decomposed within a given period, but am enabled to secure this increased output without any increase in the E. M. F., there being in fact a slight decrease in the voltage required in each cell. As a result of these conditions, the number of cells which may be coupled in series in a battery may be increased with a current of the same voltage now required, which taken with the increased output capacity of each cell, will permit the installation of generator plants having very much greater capacity than plants which have heretofore been installed, and an economical operation of these plants.

The general practice of using the inner electrodes as the anodes, and the tank as the cathode, is followed in the type of cell shown in the drawings, although it is to be understood that the polarity of the electrodes is determined by the manner of connecting them with the electric mains. The space forming the gas chamber between the baffles d and e and the baffle f is ordinarily greater than that within said baffles d and e, which condition makes this gas chamber more suitable for hydrogen, which is produced in greater volume than the oxygen.

The construction of the diaphragm r surrounding each inner electrode as stated above, is such as to permit the use of the large area diaphragm required, without such a distortion thereof because of the dead load of the diaphragm upon its support, or because of the tendency of the electrolyte to pass therethrough from adjacent the cathode to adjacent the anode, as to permit the formation of channels therethrough through which gas bubbles might pass. I find it perfectly feasible to have the diaphragm open at the bottom, since there is no tendency of gas bubbles to pass downwardly from either electrode, and by having the diaphragm project below the lower edge of the inner electrodes, it will yet be interposed in the path of the electric flux, even though this has a slight tendency outwardly of said edge of the electrode.

The buffers s are provided merely as safeguards to check any tendency of the diaphragm to buckle to an extent to approach either electrode sufficient to preclude a proper clearance adjacent the surface thereof for the accumulation of gas bubbles thereon and their separation therefrom.

By connecting the terminal bars $n$—$n^3$ to portions of the body of the electrodes $m$—$m'$ well within the edge of said electrodes, I secure uniform action throughout substantially the entire surface of each electrode plate with a resultant increase in the effectiveness of the cell, the current having a flow in all directions from the point of contact of the terminal bars with the plate, and there being substantially the same resistance throughout the entire body of the plate resulting in uniformity in the charge throughout. The use of the terminal ring t has a similar effect in relation to the tank a.

By supporting the inner electrodes from the bottom of the tank by means of the legs o, insulation $o'$, brackets $o^2$ and base $o^3$, which latter is thoroughly insulated from the bottom of the tank, accuracy and permanency in the positioning of the electrodes is not only secured, but the generation of gases about the lower edge of the electrodes and the legs o and the bottom of the tank, is prevented, although electrolytic action at this point is not strong. The double insulation employed about the legs o affords every safeguard against possible short circuiting of the apparatus, a precautionary measure which is desirable because cells of this character operates continuously for long periods, and visual inspection thereof is impossible.

By the use of the gasket p and the other characteristics of the packing for the ends of the terminal bars, I am enabled to form an effective gas-tight joint about the terminal bar and the opening in the cover through which it passes, since the wedge-like projection $p^3$ will force a portion of said gasket adjacent the terminal bar tightly about said bar and also seat the bottom of the gasket about said bar firmly upon the top plate of the cover. The gasket may be readily replaced should it deteriorate through age, and may be subjected to increased pressure by merely tightening the nuts $p^5$ in the event that the rubber of the gasket p should take a set, permitting gas leakage about the terminal bar.

In the herein described cell, I secure a highly efficient circulation of the electrolyte within the cell, which is essential because of varying pressure conditions resulting from the decomposition of electrolyte and the resultant generation of the gases. The electrolyte may flow freely about the lower edge of the diaphragm from the space adjacent the anode to the space adjacent the cathode, or vice versa, there being under normal conditions, no tendency toward the bottom of the cell, for gas bubbles to pass with the electrolyte which circulates in this manner. Supplementing this passage adjacent the bottom of the electrodes, I provide the trough system herein described, adjacent the normal level of the electrolyte in the cell, which, by permitting the electrolyte to flow from adjacent the top of the anode to adjacent the top of the cathode, or vice versa, and affording a vent to atmosphere, will prevent a development of such conditions within the cell as might lead to the admixtures of one gas with the other with resultant impurities and dangers. The trough circulation system and its vents will also prevent the development of excessive pressures within the cell.

When a cell is charged and in operation, the normal level of the electrolyte will be substantially as indicated in the drawings, which is at a point above the tube j and the opening $f'$. The inner channel of the outer trough (between the baffle f and the wall $a^4$) is in communication with the electrolyte chamber within the tank adjacent the cathode through the opening $a^5$, while the outer channel (between the wall $a^3$ and the baffle f opens to atmosphere and communicates with the inner channel of said trough through the opening $f'$, the baffle f and its insulation support g forming a liquid-tight joint between the baffle f and the bottom of said trough, so as to limit communication between the two channels of this trough to the opening $f'$.

The inner trough formed by the plate h communicates with the electrolyte compartment adjacent the anode through the opening $h'$ and communicates with the outer channel of the trough a through the tube j only, the said opening $h'$ and tube j being closely adjacent each other, but separated by the barrier i.

As a consequence, any variance in the level of the electrolyte adjacent the anode and adjacent the cathode during the operation of the cell, will result in a flow of the electrolyte in both of these troughs from adjacent the anode to adjacent the cathode, or vice versa, the length of the course of the flowing electrolyte being sufficiently great to ensure a complete separation of any gas bubbles in suspension in the electrolyte, before the electrolyte flowing from adjacent one electrode is discharged adjacent the other electrode.

Under normal conditions the outer channel of the outer electrode will be filled with distilled water for renewing the electrolyte within the cell. This water will in part flow to the inner trough through the tube j and in part through the opening $f'$ to the inner channel of the outer trough, and thence through the opening $a^5$ to within the tank adjacent the cathode, the water delivered to the inner trough flowing substantially the entire length thereof until it passes through the opening $h'$ to within the electrolyte chamber adjacent the anode.

During the operation of the cell, the surge of the electrolyte may be either from adjacent the anode to adjacent the cathode, or from adjacent the cathode to adjacent the anode. If it be the former, electrolyte will flow through the opening $h'$ along substantially the entire length of the inner trough to the tube j through which it will pass to the outer channel of the outer trough. During its flow in the inner trough, which trough opens within the oxygen chamber formed by the baffle d or e, a large percentage of the gas bubbles will merge and burst, so that when the electrolyte reaches the tube j, it will be substantially free of such bubbles. If, however, there should still remain bubbles in the electrolyte, such will accumulate upon the wall adjacent the top of said tube, where they will merge into larger bubbles and burst either within said tube or as they leave it, the gas escaping through the liquid in the outer channel of the outer trough, to atmosphere. After this electrolyte enters said outer channel it flows in either direction for about one-half the length of the said channel, before it reaches the opening $f'$, through which it may flow into the inner channel of said outer trough. This continued flow of the electrolyte in the outer channel will suffice to accomplish the separation of any remaining gas bubbles from the electrolyte, so that when the electrolyte passes through the opening $f'$ it will contain no gas bubbles whatever. After it enters the inner channel, the electrolyte must flow through approximately one-half the course of this channel until it reaches the opening $a^5$, through which it is discharged into the electrolyte chamber adjacent the cathode.

It will be noted that while the electrolyte is flowing through the inner trough, the gas in the bubbles which is separated therefrom will be discharged into the oxygen chamber.

If, however, the flow of the electrolyte be in the opposite direction, it will pass from adjacent the cathode through the opening $a^5$ and will divide and pass about opposite sides of said trough, gas bubbles being separated therefrom and merged, so that the released gas will flow into the hydrogen chamber before reaching the opening $f'$. If the hydrogen bubbles are not all separated before reaching said opening $f'$, the continued flow of electrolyte about the outer channel of the outer trough will permit the separation of any remaining bubbles, the gas therefrom escaping from the open top of this trough to atmosphere, so that the electrolyte passing through the tube $j$ into the inner trough will be entirely free of such bubbles.

It is to be noted that the trough construction described presents two tortuous channels in the outer trough, which are connected at one point only, and a single tortuous channel in the inner trough which is connected adjacent one end thereof with the electrolyte chamber adjacent the anode, and adjacent the other end thereof with the outer channel of the outer trough, and that the construction is such as to have two liquid and gas-tight troughs which impel the flow of the electrolyte through long tortuous channels with varying pressure conditions within the cell, and that there are no liquid seals in the structure employed.

By using the vent pipes $k$—$k'$ having the lower ends thereof terminating above the opening $f'$ within the inner channel of the outer trough, and above the tube $j$ in the inner trough, and by providing each of these pipes with a cup as shown, in the event that the level of the electrolyte gets low, as a result of an improper feed of distilled water into the tank, or the development of excessive pressures adjacent either electrode, the gas will be vented to atmosphere before the level of the electrolyte drops sufficiently to expose said opening or said tube. These vent pipes, however, are not essential and may be dispensed with, if desired.

The cells may be filled in any desired manner as through the gas offtake system $b$, through the trough system above described, or through the vent pipes $k$—$k'$, if such be used.

The cover construction has been heretofore referred to, and a further description thereof is therefore unnecessary.

It is not my intention to limit the invention to the precise details of construction shown in the accompanying drawings, it being apparent that such may be varied without departing from the spirit and scope of the invention.

Having described the invention, what I claim as new and desire to have protected by Letters Patent, is:—

1. An electrolytic cell embodying therein an outer electrode comprising a metal tank adapted to contain electrolyte, a high amperage, low voltage inner electrode supported by and insulated from said tank, a cover for said tank, means carried by said cover forming two noncommunicating gas chambers, one adjacent the top of said outer electrode and the other above said inner electrode, and an absorbent gas impervious diaphragm extending about said inner electrode and supported by the means forming the gas chamber above same, said diaphragm being positioned below the normal level of the electrolyte in said tank.

2. An electrolytic cell embodying therein an outer electrode comprising a metal tank adapted to contain electrolyte, a high amperage, low voltage inner electrode supported by and insulated from said tank, a cover for said tank, means carried by said cover forming two noncommunicating gas chambers, one adjacent the top of said outer electrode and the other above said inner electrode, an absorbent gas impervious diaphragm extending about said inner electrode and supported by the means forming the gas chamber above same, said diaphragm being positioned below the normal level of the electrolyte in said tank, and means positioned adjacent the normal level of the electrolyte in the cell and co-operating with said means carried by the cover, whereby electrolyte is permitted to circulate from one side of said diaphragm to the other side thereof adjacent the top of the tank, without conveying gas bubbles therewith.

3. An electrolytic cell embodying therein an outer electrode comprising a metal tank adapted to contain electrolyte, a high amperage, low voltage inner electrode supported by and insulated from said tank, a cover for said tank, means carried by said cover forming two noncommunicating gas chambers, one adjacent the top of said outer electrode and the other above said inner electrode, an absorbent gas impervious diaphragm extending about said inner electrode and supported by the means forming the gas chamber above same, said diaphragm being positioned below the normal level of the electrolyte in said tank, and having an open bottom spaced away from the bottom of said tank, and the lower edge of said inner electrode being spaced above said diaphragm, whereby electrolyte is permitted to flow freely from one side of said diaphragm to the other side thereof adjacent the bottom of the tank, and means positioned adjacent the normal level of the electrolyte in the cell and co-operating with said means carried by the cover, whereby electrolyte is permitted to circulate from one side of said diaphragm to the other side thereof adjacent the top of the tank, without conveying gas bubbles therewith.

4. An electrolytic cell embodying therein an outer electrode comprising a metal tank adapted to contain electrolyte, a high amperage, low voltage inner electrode carrying legs extending outwardly thereof toward the bottom of said tank, means interposed between said legs and the bottom of said tank, whereby said electrode is supported by, but insulated from, said tank, a cover for said tank, means carried by said cover forming two non-communicating gas chambers, one adjacent the top of said outer electrode and the other above said inner electrode, and an absorbent gas impervious diaphragm extending about said inner electrode and supported by the means forming the gas chamber above same, said diaphragm being positioned below the normal level of the electrolyte in said tank.

5. An electrolytic cell embodying therein an outer electrode comprising a metal tank adapted to contain electrolyte, a high amperage, low voltage inner electrode carrying legs extending outwardly thereof toward the bottom of said tank, insulating means interposed between said legs and the bottom of said tank comprising a sheet of insulating material covering the bottom of said tank, a heavy metallic base seated thereupon and maintained out of electrical engagement with the tank thereby, a metallic pocket for each of said legs permanently secured to said base, insulating material between each of said pockets and its leg, and an insulated member passing through each of said pockets, of said legs and of the interposed material, whereby said electrode is supported by, but insulated from, said tank, a cover for said tank, means carried by said cover forming two non-communicating gas chambers, one adjacent the top of said outer electrode and the other above said inner electrode, and an absorbent gas impervious diaphragm extending about said inner electrode and supported by the means forming the gas chamber above same, said diaphragm being positioned below the normal level of the electrolyte in said tank.

6. An electrolytic cell embodying therein an outer electrode comprising a metal tank adapted to contain electrolyte, a high amperage, low voltage inner electrode supported by and insulated from said tank, a cover for said tank, means carried by said cover forming two non-communicating gas chambers, one adjacent the top of said outer electrode and the other above said inner electrode, an absorbent gas impervious diaphragm extending about said inner electrode and supported by the means forming the gas chamber above same, said diaphragm being positioned below the normal level of the electrolyte in said tank, and having an open bottom spaced away from the bottom of said tank, and the lower edge of said inner electrode being spaced above said diaphragm, whereby electrolyte is permitted to flow freely from one side of said diaphragm to the other side thereof adjacent the bottom of the tank, electro-conductive reinforcement carried by said diaphragm whereby buckling thereof is prevented, and means positioned adjacent the normal level of the electrolyte in the cell and co-operating with said means carried by the cover, whereby electrolyte is permited to circulate from one side of said diaphragm to the other side thereof adjacent the top of the tank, without conveying gas bubbles therewith.

7. An electrolytic cell embodying therein an outer electrode comprising a metal tank adapted to contain electrolyte, a high amperage, low voltage inner electrode supported by and insulated from said tank, a cover for said tank, means carried by said cover forming two non-communicating gas chambers, one adjacent the top of said outer electrode and the other above said inner electrode, an absorbent gas impervious diaphragm extending about said inner electrode and supported by the means forming the gas chamber above same, said diaphragm being positioned below the normal level of the electrolyte in said tank, and having an open bottom spaced away from the bottom of said tank, and the lower edge of said inner electrode being spaced above said diaphragm, whereby electrolyte is permitted to flow freely from one side of said diaphragm to the other side thereof adjacent the bottom of the tank, electro nonconductive weights at the lower edge of said diaphragm, and means positioned adjacent the normal level of the electrolyte in the cell and co-operating with said means carried by the cover, whereby electrolyte is permitted to circulate from one side of said diaphragm to the other side thereof adjacent the top of the tank, without conveying gas bubbles therewith.

8. An electrolytic cell embodying therein an outer electrode comprising a metal tank adapted to contain electrolyte, a high amperage, low voltage inner electrode supported by and insulated from said tank, a cover for said tank, means carried by said cover forming two noncommunicating gas chambers, one adjacent the top of said outer electrode and the other above said inner electrode, an absorbent gas impervious diaphragm extending about said inner electrode and supported by the means forming the gas chamber above same, said diaphragm being positioned below the normal level of the electrolyte in said tank, and having an open bottom spaced away from the bottom of said tank, and the lower edge of said inner electrode being spaced above said diaphragm, whereby electrolyte is permitted to flow freely from one side of said diaphragm to the other side thereof adjacent the bottom of the tank, electro nonconductive weights at the lower edge of said diaphragm, electro-conductive reinforcement carried by said diaphragm whereby buckling thereof is prevented, and means positioned adjacent the normal level of the electrolyte in the cell and co-operating with said means carried by the cover, whereby electrolyte is permitted to circulate from one side of said diaphragm to the other side thereof adjacent the top of the tank, without conveying gas bubbles therewith.

9. An electrolytic cell embodying therein an outer electrode comprising a metal tank adapted to contain electrolyte, a high amperage, low voltage inner electrode, a cover for said tank, means carried by said cover forming two non-communicating gas chambers, one adjacent the top of said outer electrode and the other above said inner electrode, an absorbent gas impervious diaphragm extending about said inner electrode and supported by the means forming the gas chamber above same, said diaphragm being positioned below the normal level of the electrolyte in said tank, a terminal bar mechanically and electrically connected with said inner electrode at a point thereof well within its edges, whereby a more uniform distribution of the current throughout the plate is effected, said terminal bar passing through an opening in said cover, and means whereby a gas-tight joint is formed about said terminal bar and about the opening in the cover through which it passes.

10. An electrolytic cell embodying therein an outer electrode comprising a metal tank adapted to contain electrolyte, a high amperage, low voltage inner electrode, a cover for said tank, means carried by said cover forming two non-communicating gas chambers, one adjacent the top of said outer electrode and the other above said inner electrode, an absorbent gas impervious diaphragm extending about said inner electrode and supported by the means forming the gas chamber above same, said diaphragm being positioned below the normal level of the electrolyte in said tank, a terminal bar mechanically and electrically connected with said inner electrode at a point thereof well within its edges, whereby a more uniform distribution of the current throughout the plate is effected, said terminal bar passing through an opening in said cover, means whereby a gas-tight joint is formed about said terminal bar and about the opening in the cover through which it passes, and a terminal band having relatively higher conductivity than the material of said tank, inclosing said tank intermediate the top and bottom thereof and of said inner electrode, and electrically connected with said tank at all points of its length.

11. An electrolytic cell embodying therein an outer electrode comprising a metal tank adapted to contain electrolyte, a high amperage, low voltage inner electrode supported by and insulated from said tank, a cover for said tank, means carried by said cover forming two noncommunicating gas chambers, one adjacent the top of said outer electrode and the other above said inner electrode, an absorbent gas impervious diaphragm extending about said inner electrode and supported by the means forming the gas chamber above same, said diaphragm being positioned below the normal level of the electrolyte in said tank, and having an open bottom spaced away from the bottom of said tank, and the lower edge of said inner electrode being spaced above said diaphragm, whereby electrolyte is permitted to flow freely from one side of said diaphragm to the other side thereof adjacent the bottom of the tank, electro-conductive reinforcement carried by said diaphragm whereby buckling thereof is prevented, electro non-conductive buffers extending from the surface of said diaphragm toward the electrodes upon opposite sides thereof, and means positioned adjacent the normal level of the electrolyte in the cell and co-operating with said means carried by the cover, whereby electrolyte is permitted to circulate from one side of said diaphragm to the other side thereof adjacent the top of the tank, without conveying gas bubbles therewith.

12. An electrolytic cell embodying therein an outer electrode comprising a metal tank adapted to contain electrolyte, a high amperage, low voltage inner electrode supported by and insulated from said tank, a cover for said tank, an inner and an outer baffle carried by said cover and forming two non-communicating gas chambers, one adjacent the top of said outer electrode and the other about the top of said inner electrode, an absorbent gas impervious diaphragm positioned below the normal level of the electrolyte in said tank, and having an open bottom spaced away from the bottom thereof, the lower edge of said inner electrode being spaced above said diaphragm, whereby electrolyte is permitted to flow freely from one side of said diaphragm to the other side thereof adjacent the bottom of the tank, electro-conductive reinforcement carried by said diaphragm whereby buckling thereof is prevented, means securing the upper edge of said diaphragm to said inner baffle, including insulating material disposed between said diaphragm and said baffle, and means positioned adjacent the normal level of the electrolyte in the cell and co-operating with said baffles carried by the cover, whereby electrolyte is permitted to circulate from one side of said diaphragm to the other side thereof adjacent the top of the tank, without conveying gas bubbles therewith.

13. An electrolytic cell embodying therein an outer electrode comprising a metal tank adapted to contain electrolyte, a high amperage, low voltage inner electrode, a cover for said tank, means carried by said cover forming two non-communicating gas chambers, one adjacent the top of said outer electrode and the other above said inner electrode, an absorbent gas impervious diaphragm extending about said inner electrode and supported by the means forming the gas chamber above same, said diaphragm being positioned below the normal level of the electrolyte in said tank, a terminal bar mechanically and electrically connected with said inner electrode at a point thereof well within its edges, whereby a more uniform distribution of the current throughout the plate is effected, said terminal bar passing through an opening in said cover, a plurality of screw studs secured exteriorly of said cover about said opening, a resilient non-conductive packing within said studs and encircling said terminal bar, a block of non-conductive material slidably mounted upon said studs, said block having a projecting wedge engaging said gasket adjacent said terminal bar, and means whereby said block may be forced toward said cover upon said studs to simultaneously pack said opening and said terminal bar.

14. An electrolytic cell embodying therein an outer electrode comprising a metal tank adapted to contain electrolyte, a high amperage, low voltage inner electrode supported by and insulated from said tank, a sheet metal cover for said tank consisting of an inner baffle forming a continuous barrier above said inner electrode, and a continuous barrier about the top of, and within said outer electrode, a top plate closing the space within said inner baffle and a second top plate closing the space between said baffles, said top plates and said baffles being welded together, whereby two non-communicating gas chambers are formed, one adjacent the top of said outer electrode and the other above said inner electrode, and any leakage due to imperfect welding will be to atmosphere instead of from one chamber to the other, and an absorbent gas impervious diaphragm extending about said inner electrode and supported by said inner baffle, said diaphragm being positioned below the normal level of the electrolyte in said tank.

15. An electrolytic cell embodying therein an outer electrode comprising a metal tank adapted to contain electrolyte, and a partition within said tank, the bottom of which is spaced above the bottom of said tank, and the top of which is spaced below the top of said tank, high amperage, low voltage inner electrodes supported by and insulated from said tank upon opposite sides of said partition, a cover for said tank, means carried by said cover forming non-communicating gas chambers, one adjacent the top of said outer electrode and one above each of said inner electrodes, and an absorbent gas impervious diaphragm extending about each of said inner electrodes and supported by the means forming a gas chamber above same, said diaphragms being positioned below the normal level of the electrolyte in said tank.

16. An electrolytic cell embodying therein an outer electrode comprising a metal tank adapted to contain electrolyte, and a partition within said tank, the bottom of which is spaced above the bottom of said tank, and the top of which is spaced below the top of said tank, high amperage, low voltage inner electrodes supported by and insulated from said tank upon opposite sides of said partition, a cover for said tank, means carried by said cover forming non-communicating gas chambers, one adjacent the top of said outer electrode and one above each of said inner electrodes, an absorbent gas impervious diaphragm extending about each of said inner electrodes and supported by the means forming a gas chamber above same, said diaphragms being positioned below the normal level of the electrolyte in said tank, and each having an open bottom spaced away from the bottom of said tank, and the lower edges of said inner electrodes each being spaced above its associated diaphragm, whereby electrolyte is permitted to flow freely from one side of said diaphragm to the other side thereof adjacent the bottom of the tank, and connecting means adjacent each of said inner electrodes and said outer electrode adjacent the normal level of the electrolyte in the cell, and co-operating with the means forming the different gas chambers, whereby electrolyte is permitted to circulate from one side of said diaphragm to the other side thereof adjacent the top of the tank, without conveying gas bubbles therewith.

In witness whereof I have hereunto affixed my signature, in the presence of two subscribing witnesses, this 12th day of January, 1920.

ISAAC H. LEVIN.

Witnesses:
D. J. TONKONOGY,
F. T. WENTWORTH.